(12) United States Patent
Amarilio et al.

(10) Patent No.: US 9,618,964 B2
(45) Date of Patent: Apr. 11, 2017

(54) CONTROL CIRCUITS FOR GENERATING OUTPUT ENABLE SIGNALS, AND RELATED SYSTEMS AND METHODS

(71) Applicant: QUALCOMM Incorporated, San Diego, CA (US)

(72) Inventors: Lior Amarilio, Yokneam (IL); Meysam Azin, San Diego, CA (US); Alexander Khazin, Nesher (IL); Le Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/713,058

(22) Filed: May 15, 2015

(65) Prior Publication Data

US 2016/0306382 A1    Oct. 20, 2016

Related U.S. Application Data

(60) Provisional application No. 62/147,296, filed on Apr. 14, 2015.

(51) Int. Cl.
*G06F 1/00* (2006.01)
*G06F 1/10* (2006.01)
(Continued)

(52) U.S. Cl.
CPC ............... *G06F 1/10* (2013.01); *G06F 1/06* (2013.01); *G06F 13/4291* (2013.01)

(58) Field of Classification Search
CPC ..................... G06F 1/10; G06F 1/06
(Continued)

(56) References Cited

U.S. PATENT DOCUMENTS 6,072,348 A * 6/2000 New ........................ G06F 1/32
                                                        327/295
7,521,973 B1 * 4/2009 Anemikos ................ G06F 1/10
                                                        327/144
(Continued)

FOREIGN PATENT DOCUMENTS

JP         2005018439 A      1/2005

OTHER PUBLICATIONS

Invitation to Pay Additional Fees and Partial Search Report for PCT/US2016/023883, mailed Jun. 17, 2016, 7 pages.
(Continued)

*Primary Examiner* — Aurel Prifti
(74) *Attorney, Agent, or Firm* — Withrow & Terranova, PLLC

(57) ABSTRACT

Control circuits for generating output enable signals are disclosed. In one aspect, a control circuit is provided that employs combinatorial logic to generate an output enable signal that meets timing constraints using a standard clock signal, a feedback clock signal based on the standard clock signal, and a single data rate (SDR) data output stream. The control circuit includes a double data rate (DDR) conversion circuit configured to generate a DDR output stream based on a received SDR output stream. The control circuit includes an output enable circuit configured to receive the standard clock signal, feedback clock signal, and DDR output stream, and to generate the output enable signal that is asserted and de-asserted according to the defined timing constraints. The control circuit is configured to generate an accurately timed output enable signal without the need for a fast clock signal in addition to the standard clock signal.

23 Claims, 9 Drawing Sheets

(51) Int. Cl.
  *G06F 13/42* (2006.01)
  *G06F 1/06* (2006.01)
(58) Field of Classification Search
  USPC ......... 327/295, 310; 375/354, 316; 714/731;
  710/110; 713/340, 401, 500
  See application file for complete search history.

(56) References Cited

U.S. PATENT DOCUMENTS

| | | | |
|---|---|---|---|
| 8,514,994 B1* | 8/2013 | Lee | H03K 19/1737 |
| | | | 375/354 |
| 2007/0283182 A1* | 12/2007 | Defazio | G11C 7/1012 |
| | | | 713/500 |
| 2009/0055005 A1 | 2/2009 | Oxman et al. | |
| 2009/0129505 A1* | 5/2009 | Ware | G06F 13/4243 |
| | | | 375/316 |
| 2009/0310433 A1* | 12/2009 | Caltagirone | G06F 13/4291 |
| | | | 365/233.13 |
| 2011/0185215 A1* | 7/2011 | Neben | G06F 1/12 |
| | | | 713/401 |
| 2012/0278646 A1* | 11/2012 | Gruber | G06F 13/4291 |
| | | | 713/400 |
| 2013/0100962 A1 | 4/2013 | Shettel | |
| 2013/0322461 A1 | 12/2013 | Poulsen | |
| 2014/0184298 A1* | 7/2014 | Hirano | H03K 5/00006 |
| | | | 327/310 |
| 2014/0244884 A1 | 8/2014 | Segev et al. | |
| 2014/0372823 A1* | 12/2014 | Dimri | G01R 31/31726 |
| | | | 714/731 |
| 2016/0072492 A1* | 3/2016 | Amarilio | H03K 5/13 |
| | | | 710/110 |

OTHER PUBLICATIONS

International Search Report and Written Opinion for PCT/US2016/023883, mailed Oct. 18, 2016, 16 pages.

* cited by examiner

CONTROL CIRCUITS FOR GENERATING OUTPUT ENABLE SIGNALS, AND RELATED SYSTEMS AND METHODS

PRIORITY CLAIM

The present application claims priority to U.S. patent application Ser. No. 62/147,296, filed Apr. 14, 2015 and entitled "CONTROL CIRCUITS FOR GENERATING OUTPUT ENABLE SIGNALS, AND RELATED SYSTEMS AND METHODS," which is incorporated herein by reference in its entirety.

BACKGROUND

I. Field of the Disclosure

The technology of the disclosure relates generally to control circuits, and particularly to control circuits that generate output enable signals.

II. Background

Electronic devices, such as mobile phones and computer tablets, have become common in contemporary society for supporting various everyday uses. These electronic devices each commonly include a microphone and speakers. Typical microphones and speakers used in electronic devices have analog interfaces, requiring dedicated two (2) port wiring to connect each device. However, electronic devices may include multiple audio devices, such as multiple microphones and/or speakers. Thus, it may be desired to allow for a microprocessor or other control device in such electronic devices to be able to communicate audio data to multiple audio devices over a common communications bus. Further, it may be desired to provide a defined communications protocol for transporting digital data relating to audio channels to different audio devices in an electronic device over a common communications bus.

In this regard, the MIPI® Alliance has announced Sound-Wire™ as a communications protocol for transporting digital data relating to audio channels to different audio devices associated with an electronic device. In SoundWire™, one SoundWire™ master interface allows a master electronic device ("master device"), or monitor communicatively coupled thereto, to communicate over a common communications bus with one or more slave electronic devices ("slave devices") coupled to SoundWire™ slave interfaces. As of this writing, the current version of SoundWire™ is revision 1.0, which was made internally available on Mar. 12, 2015 to MIPI® Alliance members through the MIPI® sharepoint file server.

The common communications bus in SoundWire™ includes two separate wires: a common data wire ("DATA") and a common clock wire ("CLK"). In an attempt to provide a low power consumption environment, the SoundWire™ protocol employs a modified Non Return to Zero Inverted ("NRZI") encoding scheme in conjunction with a double data rate ("DDR"), wherein the DATA is examined, and potentially driven, upon every transition of a clock signal on the CLK. Employing the modified NRZI encoding scheme with DDR in this manner requires that the DATA be asserted and de-asserted according to timing constraints defined in the SoundWire™ protocol. However, clock and logic circuitry used to control the DATA in this manner can be power intensive. Therefore, it would be advantageous to control the DATA so as to meet the timing constraints of the Sound-Wire™ protocol, while also reducing power consumption of corresponding circuitry.

SUMMARY OF THE DISCLOSURE

Aspects disclosed in the detailed description include control circuits for generating output enable signals, and related systems and methods. In one aspect, a control circuit is provided that employs combinatorial logic to generate an output enable signal that meets defined timing constraints using only a standard clock signal (e.g., a slow clock signal), a feedback clock signal based on the standard clock signal, and a single data rate (SDR) output stream. The control circuit includes a double data rate (DDR) conversion circuit that is configured to generate a DDR output stream based on the SDR output stream. Further, the control circuit includes an output enable circuit that is configured to receive the standard clock signal, the feedback clock signal, and the DDR output stream generated by the DDR conversion circuit. The output enable circuit is further configured to generate the output enable signal that is asserted and de-asserted according to the defined timing constraints. In this manner, the control circuit is configured to generate an accurately timed output enable signal without a fast clock signal, thus avoiding power-consuming fast clock circuitry. Therefore, generating the output enable signal in this manner allows the control circuit to provide an accurate output enable signal to other circuitry while reducing power consumption as compared to circuits employing both a standard clock signal and a fast clock signal.

In this regard, in one aspect, a control circuit is disclosed. The control circuit comprises a DDR conversion circuit configured to receive an SDR output stream and generate a DDR output stream based on the SDR output stream. The control circuit further comprises an output enable circuit. The output enable circuit is configured to receive a standard clock signal and a feedback clock signal, wherein the feedback clock signal is based on the standard clock signal. The output enable circuit is also configured to receive the DDR output stream generated by the DDR conversion circuit. The output enable circuit is further configured to generate an output enable signal, wherein the output enable signal is asserted and de-asserted according to timing constraints.

In another aspect, a control circuit is disclosed. The control circuit comprises a means for receiving an SDR output stream and a means for generating a DDR output stream based on the SDR output stream. The control circuit further comprises a means for receiving a standard clock signal and a means for receiving a feedback clock signal, wherein the feedback clock signal is based on the standard clock signal. The control circuit further comprises a means for generating an output enable signal based on the standard clock signal, the feedback clock signal, and the DDR output stream, wherein the output enable signal is asserted and de-asserted according to timing constraints.

In another aspect, a method for providing an output enable signal is disclosed. The method comprises receiving an SDR output stream at a DDR conversion circuit and generating with the DDR conversion circuit a DDR output stream based on the SDR output stream. The method further comprises receiving a standard clock signal at an output enable circuit and a feedback clock signal at the output enable circuit, wherein the feedback clock signal is based on the standard clock signal. The method further comprises generating with the output enable circuit an output enable signal based on the standard clock signal, the feedback clock signal, and the DDR output stream, wherein the output enable signal is asserted and de-asserted according to timing constraints.

In another aspect, a system is disclosed. The system comprises a multi-point, multi-drop communications bus comprising a data wire and a clock wire. The system further comprises a master device coupled to one or more slave devices via the multi-point, multi-drop communications bus. The master device comprises a digital logic circuit configured to complete operations associated with the master device, a bus interface configured to interface with the multi-point, multi-drop communications bus, and a control circuit. The control circuit comprises DDR conversion circuit configured to receive an SDR output stream and generate a DDR output stream based on the SDR output stream. The control circuit further comprises an output enable circuit configured to receive a standard clock signal and a feedback clock signal, wherein the feedback clock signal is based on the standard clock signal. The control circuit is further configured to receive the DDR output stream generated by the DDR conversion circuit and generate an output enable signal, wherein the output enable signal is asserted and de-asserted according to timing constraints.

DETAILED DESCRIPTION

Figure 1:
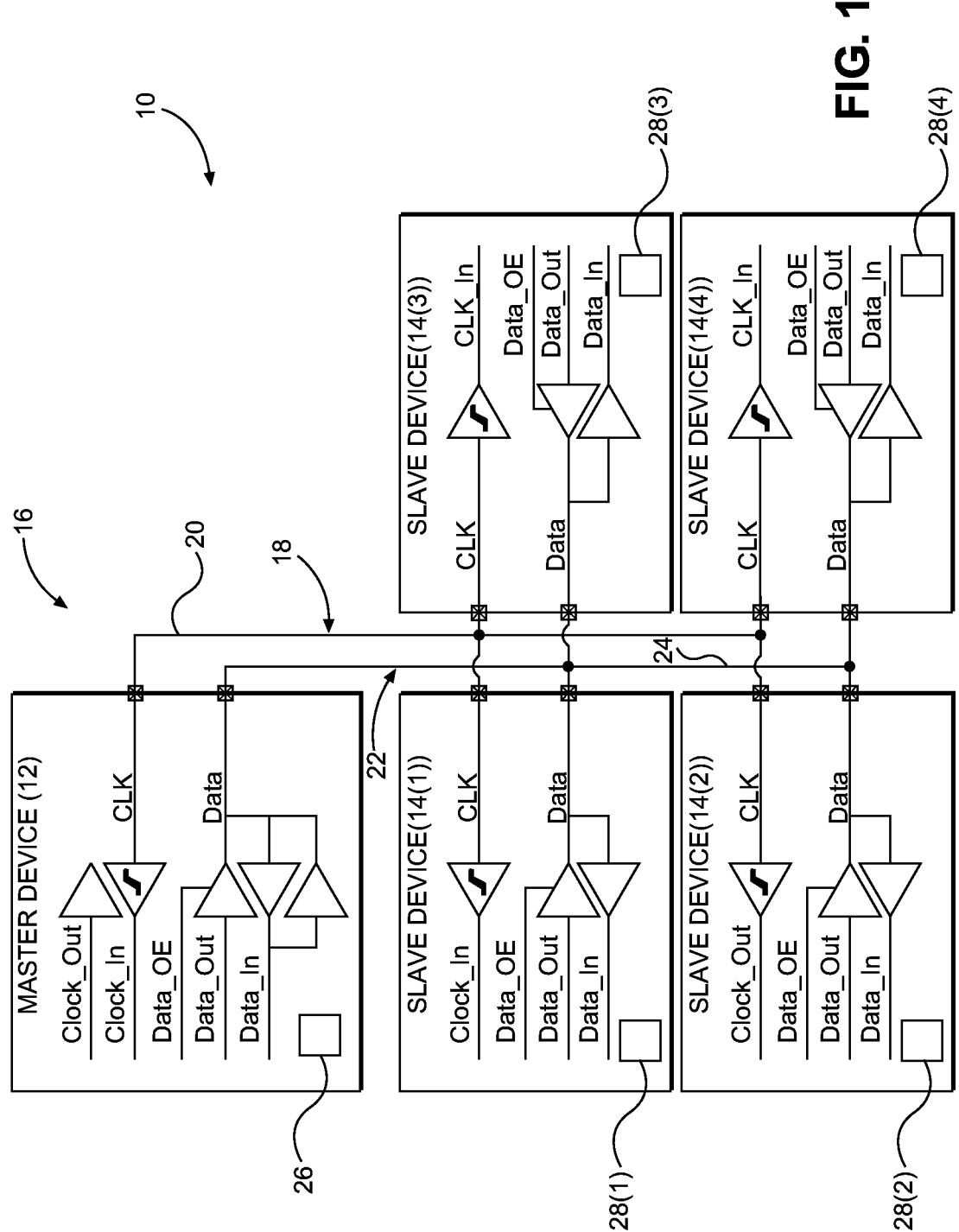
FIG. 1 is a block diagram of an exemplary SoundWire™ system that includes a master device coupled to a plurality of slave devices.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include control circuits for generating output enable signals, and related systems and methods. In one aspect, a control circuit is provided that employs combinatorial logic to generate an output enable signal that meets defined timing constraints using only a standard clock signal (e.g., a slow clock signal), a feedback clock signal based on the standard clock signal, and a single data rate (SDR) data output stream. The control circuit includes a double data rate (DDR) conversion circuit that is configured to generate a DDR output stream based on the SDR output stream. Further, the control circuit includes an output enable circuit that is configured to receive the standard clock signal, the feedback clock signal, and the DDR output stream generated by the DDR conversion circuit. The output enable circuit is further configured to generate the output enable signal that is asserted and de-asserted according to the defined timing constraints. In this manner, the control circuit is configured to generate an accurately timed output enable signal without a fast clock signal, thus avoiding power consuming fast clock circuitry. Therefore, generating the output enable signal in this manner allows the control circuit to provide an accurate output enable signal to other circuitry while reducing power consumption as compared to circuits employing both a standard clock signal and a fast clock signal.

Before discussing the control circuit in aspects disclosed herein, an exemplary SoundWire™ system is first described. In this regard, FIG. 1 is a block diagram of an exemplary SoundWire™ system 10 having one (1) master device 12 and four (4) slave devices 14(1)-14(4) communicatively coupled to a SoundWire™ communications bus 16 as SoundWire™-compatible electronic devices. In an exemplary aspect, the slave devices 14(1)-14(4) may be microphones, speakers, or other audio devices. The master device 12 communicates with the slave devices 14(1)-14(4) using two (2) signals: a clock signal 18 communicated over a common clock wire 20 ("CLK 20"), and a data signal 22 communicated on a common data wire 24 ("DATA 24") of the SoundWire™ communications bus 16. While only four slave devices 14(1)-14(4) are illustrated in FIG. 1, it should be appreciated that the SoundWire™ specification supports up to eleven (11) slave devices 14 per master device 12. It should be appreciated that the master device 12 may have a control system 26 associated therewith, which may be a hardware implemented processor with associated software stored in memory associated with the processor. In one exemplary aspect, the control system 26 is part of the system-on-a-chip (SoC) of the master device 12. In an alternate exemplary aspect, the control system 26 may be associated with a central processor for the computing device that includes the SoundWire™ system 10. In further exemplary aspects, the slave devices 14(1)-14(4) each have a respective slave control system 28(1)-28(4). Notably, while this aspect illustrates various elements within the master device 12 and the slave devices 14(1)-14(4), other aspects may include alternative elements or configurations and achieve similar functionality.

With continuing reference to FIG. 1, the SoundWire™ system 10 employs a modified Non Return to Zero Inverted ("NRZI") encoding scheme in conjunction with a double data rate ("DDR"), wherein the DATA 24 is examined, and potentially driven, upon every transition of the clock signal 18. As a non-limiting example, the DATA 24 may be driven by the slave devices 14(1)-14(4) based on a corresponding data output enable signal ("DATA_OE") of each respective slave device 14(1)-14(4). Driving the data signal 22 on the DATA 24 according to the DDR in this manner causes a respective DATA_OE to potentially transition four (4) times during each cycle of the clock signal 18. More specifically, a respective DATA_OE may transition to a high logic level and drive a first data segment (not shown) in response to the clock signal 18 transitioning to a high logic level. However, upon the clock signal 18 reaching a low logic level, the DATA_OE may transition to a low logic level so as to stop driving the first data segment, and subsequently transition to a high logic level to begin driving a second data segment (not shown). When the clock signal 18 again transitions to a high logic level, the DATA_OE may transition to a low logic level to stop driving the second data segment. Notably, the timing with which such multiple transitions of the DATA_OE occur needs to be timed according to timing constraints defined by the SoundWire™ protocol.

Figure 2:
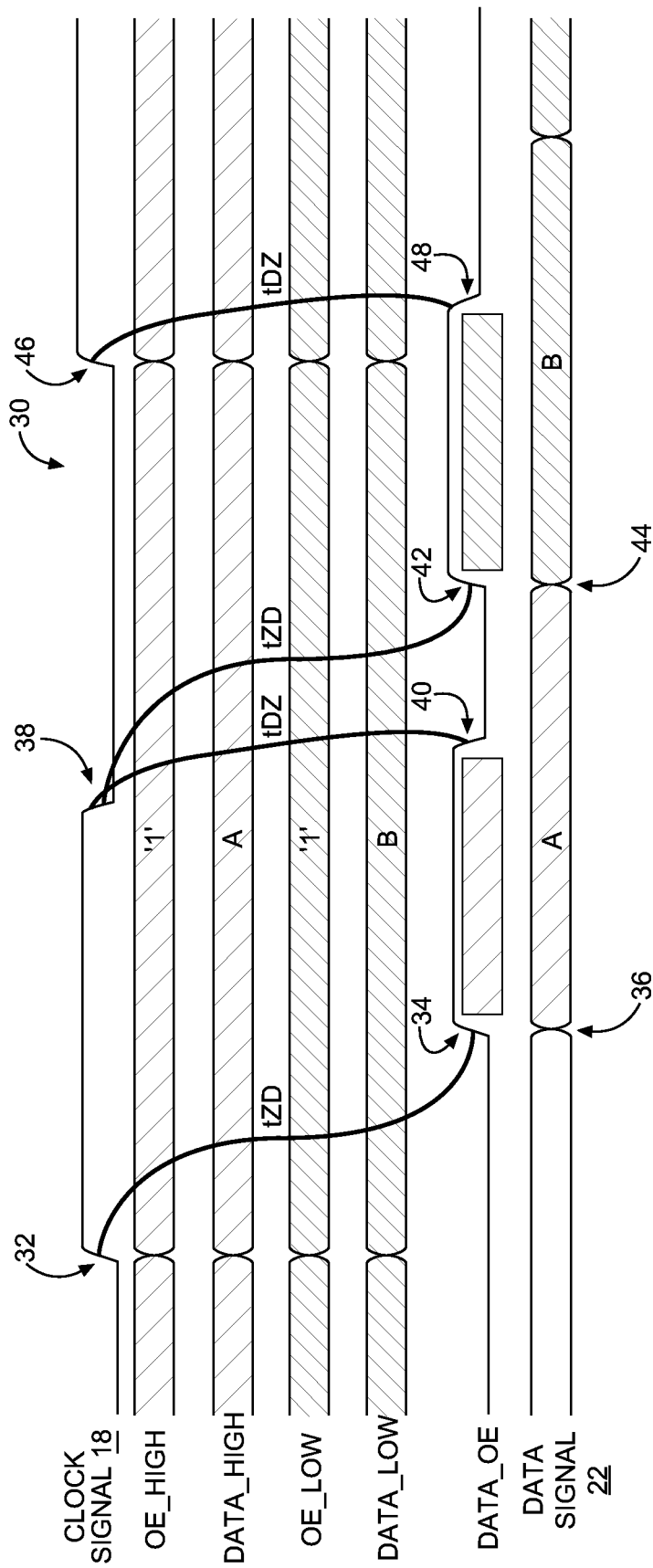
FIG. 2 is a timing diagram of signals in an exemplary SoundWire™ system illustrating timing constraints associated with enabling a data output signal in compliance with the SoundWire™ protocol.

In this regard, FIG. 2 illustrates signals 30 in the exemplary SoundWire™ system 10 in FIG. 1 illustrating timing constraints associated with enabling the data signal 22 in compliance with the SoundWire™ protocol. As previously described, to drive the data signal 22 on the DATA 24, a respective DATA_OE may transition four (4) times during one (1) cycle of the clock signal 18. The DATA_OE transitions in response to each rising and falling transition of the clock signal 18. In this example, in response to a rising transition 32 of the clock signal 18, the DATA_OE is configured to drive a data high signal ("DATA_HIGH") when an output enable high signal ("OE_HIGH") equals logic '1' and the current time slot is owned by the corresponding device in the SoundWire™ system 10. Notably, to remain compliant with the SoundWire™ protocol, the DATA_OE must be asserted after a minimum time period ("tZD") measured from the earliest transition of the clock signal 18 (i.e., the rising transition 32). Thus, in response to the rising transition 32 of the clock signal 18, the DATA_OE experiences a rising transition 34 after a tZD time period because the OE_HIGH equals logic '1.' The rising transition 34 of the DATA_OE causes the 'A' value of DATA_HIGH to be driven to the data signal 22 on the DATA 24 (arrow 36).

With continuing reference to FIG. 2, in response to a falling transition 38 of the clock signal 18, the SoundWire™ protocol configures the DATA_OE to drive a data low signal ("DATA_LOW") when an output enable low signal ("OE_LOW") equals logic '1' and the current time slot is owned by the corresponding device in the SoundWire™ system 10. To remain compliant with the SoundWire™ protocol, the DATA_OE must be de-asserted within a maximum time period ("tDZ") measured from the latest transition of the clock signal 18 (i.e., the falling transition 38). Thus, in response to the falling transition 38 of the clock signal 18, the DATA_OE experiences a falling transition 40 no later than a tDZ time following the falling transition 38. Similar to the rising transition 34, the DATA_OE experiences a rising transition 42 after a tZD time because the OE_LOW equals logic '1.' The rising transition 42 of the DATA_OE causes the 'B' value of DATA_LOW to be driven to the data signal 22 on the DATA 24 (arrow 44). Further, in response to a rising transition 46 of the clock signal 18, to remain compliant with the SoundWire™ protocol, the DATA_OE experiences a falling transition 48 no later than a tDZ time following the rising transition 46. Therefore, circuitry employed to assert and de-assert the DATA_OE so as to remain compliant with the SoundWire™ protocol should operate according to the timing constraints illustrated by the signals 30 in FIG. 2.

Figure 3:
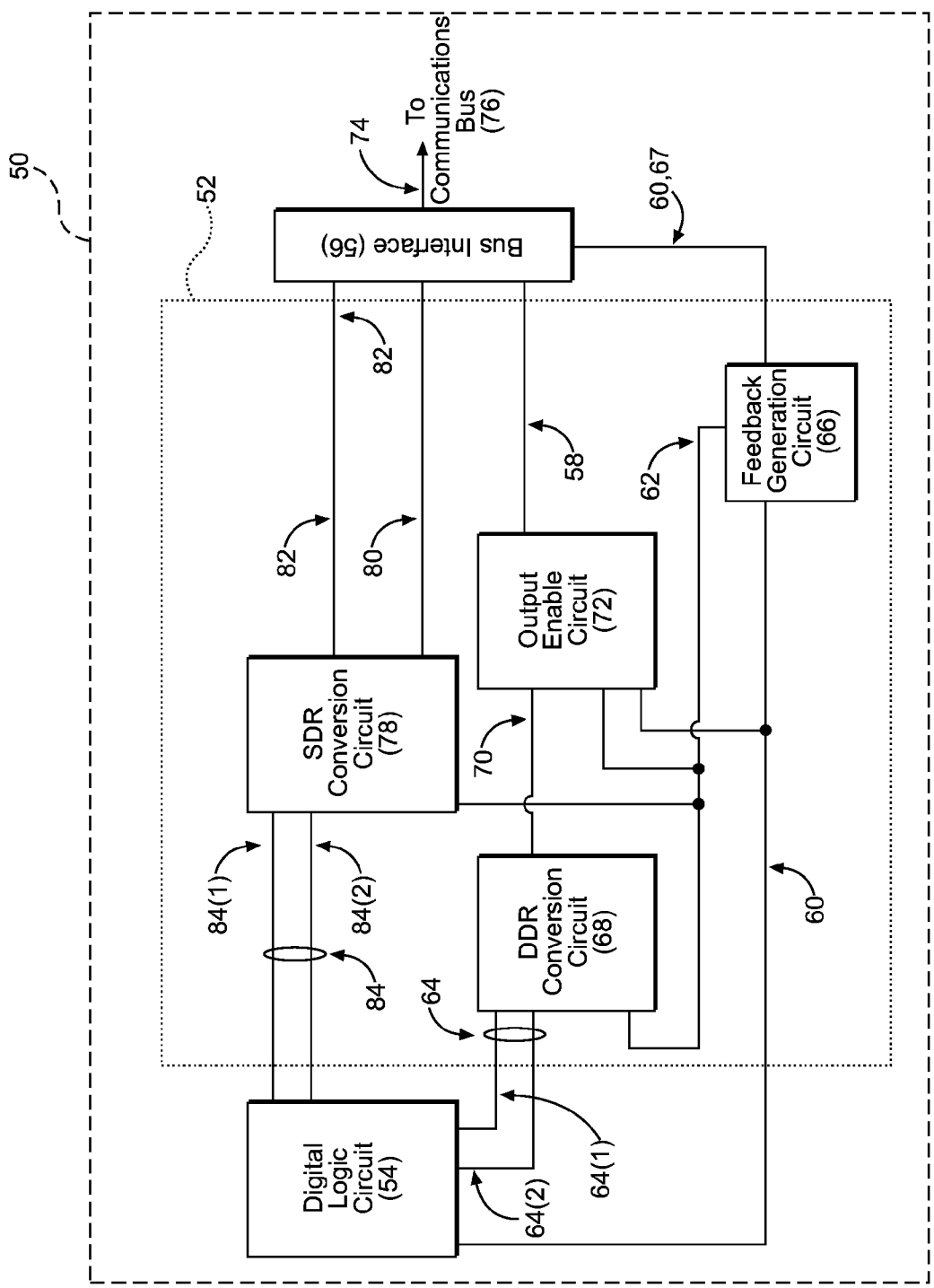
FIG. 3 is a block diagram of an exemplary control circuit coupling a digital logic circuit of a device to a bus interface of the device, wherein the control circuit is configured to generate an output enable signal according to the timing constraints of the SoundWire™ protocol.

In this regard, FIG. 3 illustrates an exemplary device 50 wherein an exemplary control circuit 52 couples a digital logic circuit 54 to a bus interface 56 of the device 50. Notably, the digital logic circuit 54 may correspond to either a master device or a slave device. In this aspect, the control circuit 52 is configured to generate an output enable signal 58 according to the timing constraints of the SoundWire™ protocol. Notably, the control circuit 52 is configured to generate the output enable signal 58 that meets the timing constraints using only a standard clock signal 60 (e.g., a slow clock signal), a feedback clock signal 62 based on the standard clock signal 60, and a single data rate (SDR) output stream 64. In this aspect, the SDR output stream 64 is provided by the digital logic circuit 54, wherein the SDR output stream 64 includes an SDR low output stream 64(1) and an SDR high output stream 64(2). A feedback generation circuit 66 is configured to generate the feedback clock signal 62 in response to receiving the standard clock signal 60. In this embodiment, the feedback generation circuit 66 provides the standard clock signal 60 to the bus interface 56 and uses a bus clock signal 67 received from the bus interface 56 to generate the feedback clock signal 62. Notably, alternative embodiments may configure the feedback generation circuit 66 to generate the feedback clock signal 62 in a self-contained manner, wherein the feedback clock signal 62 is based on the standard clock signal 60 without communicating with the bus interface 56. Further, the control circuit 52 also includes a double data rate (DDR) conversion circuit 68 that is configured to generate a DDR output stream 70 based on the SDR output stream 64. The DDR output stream 70 is a combination of the SDR output stream 64 and time slot ownership, wherein the DDR output stream 70 is asserted in response to the SDR output stream 64 when the current time slot is owned by the device 50. Notably, the DDR conversion circuit 68 is sometimes referred to herein as a means for receiving the SDR output stream 64 and a means for generating the DDR output stream 70 based on the SDR output stream 64. In this aspect, the DDR conversion circuit 68 uses the feedback clock signal 62 when generating the DDR output stream 70. However, other aspects may configure the DDR conversion circuit 68 so as to not require the feedback clock signal 62.

With continuing reference to FIG. 3, the control circuit 52 includes an output enable circuit 72 that is configured to receive the standard clock signal 60, the feedback clock signal 62, and the DDR output stream 70. The output enable circuit 72 is further configured to generate the output enable signal 58 that is asserted and de-asserted according to the defined timing constraints. Notably, the output enable circuit 72 is sometimes referred to herein as a means for receiving the standard clock signal 60 and a means for receiving the feedback clock signal 62. Further, the output enable circuit 72 is sometimes referred to herein as a means for generating the output enable signal 58 based on the standard clock signal 60, the feedback clock signal 62, and the DDR output stream 70. The bus interface 56 is configured to receive the output enable signal 58 from the output enable circuit 72 so as to provide a data signal 74 to a communications bus 76 with the desired timing. In this aspect, the communications bus 76 is a multi-point, multi-drop communications bus 76 that may function using various protocols such as, but not limited to, the SoundWire™ protocol. In this manner, the control circuit 52 is configured to generate an accurately timed output enable signal 58 without employing a fast clock signal, thus avoiding power-consuming fast clock circuitry. Therefore, the control circuit 52 may reduce power consumption as compared to circuits employing both a standard clock signal 60 and a fast clock signal.

With continuing reference to FIG. 3, the control circuit 52 also includes an SDR conversion circuit 78 that is configured to generate an NRZI data signal 80 based on a DDR input stream 82 received from the communications bus 76 via the bus interface 56 and the feedback clock signal 62. The NRZI data signal 80 is used by the bus interface 56 to ensure that the data signal 74 is driven to the communications bus 76 using NRZI encoding according to the Sound-Wire™ protocol. Further, the SDR conversion circuit 78 is configured to generate an SDR input stream 84 based on the DDR input stream 82 and the feedback clock signal 62, wherein the SDR input stream 84 is provided to the digital logic circuit 54 as an SDR low input stream 84(1) and an SDR high input stream 84(2).

Figure 4:
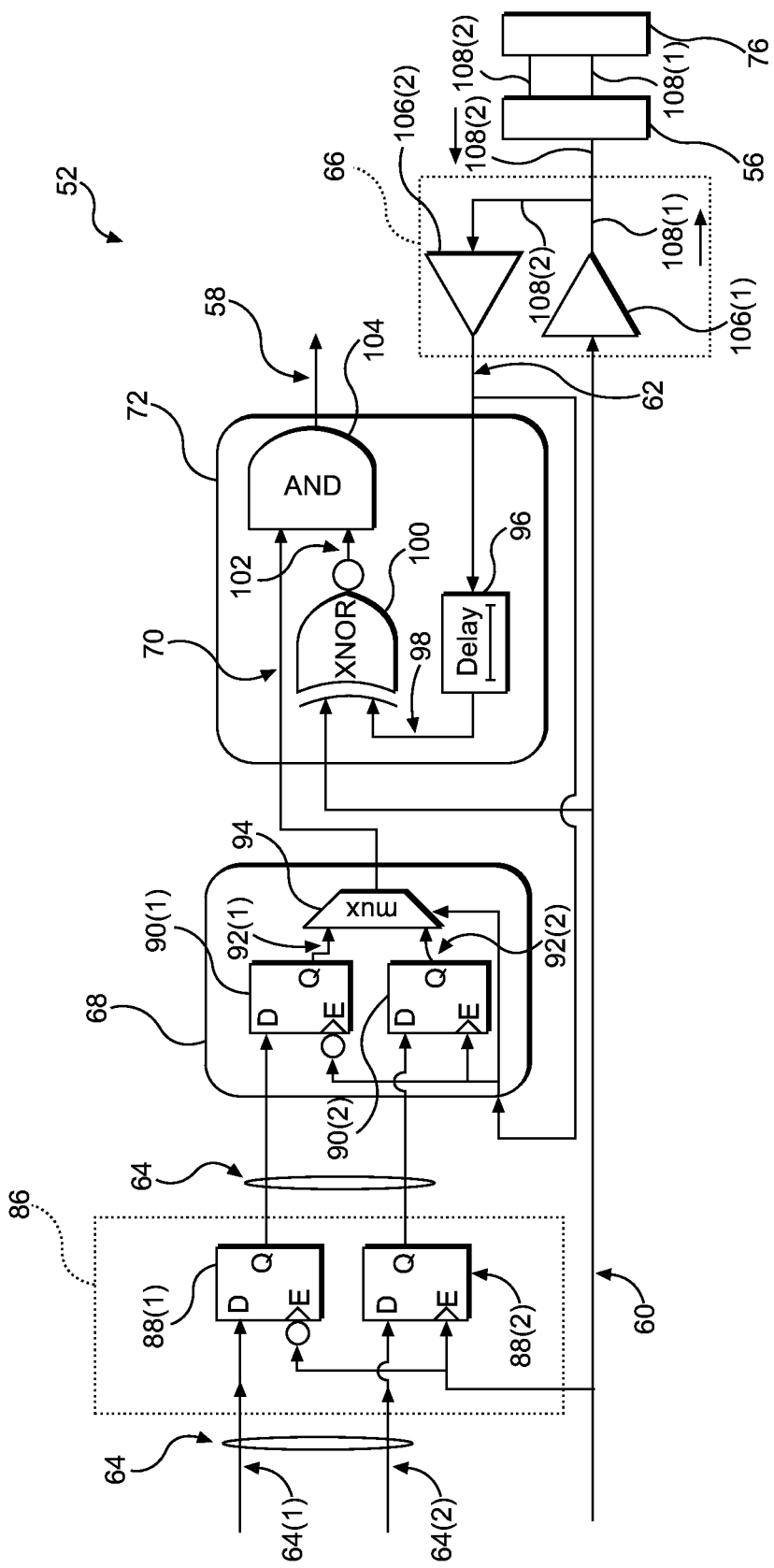
FIG. 4 is a circuit diagram of a simplified exemplary control circuit configured to generate an output enable signal according to the timing constraints of the SoundWire™ protocol.

To achieve the functionality described in relation to FIG. 3, the control circuit 52 may employ various circuit elements. In this regard, FIG. 4 illustrates a simplified version of the control circuit 52 in FIG. 3, wherein the control circuit 52 is configured to generate the output enable signal 58 according to the timing constraints of the SoundWire™ protocol. In this aspect, the control circuit 52 includes the DDR conversion circuit 68, the output enable circuit 72, and the feedback generation circuit 66. Additionally, the control circuit 52 employs a synchronizing circuit 86 that includes a low flip-flop 88(1) and a high flip-flop 88(2) configured to receive the SDR low output stream 64(1) and the SDR high output stream 64(2), respectively, from the digital logic circuit 54 (not shown). The low flip-flop 88(1) and the high flip-flop 88(2) are configured to provide the SDR low output stream 64(1) and the SDR high output stream 64(2), respectively, to the DDR conversion circuit 68 in response to the standard clock signal 60. Thus, the synchronizing circuit 86 synchronizes the SDR output stream 64 with the standard clock signal 60 prior to providing the SDR output stream 64 to the DDR conversion circuit 68. Further, in this aspect, the DDR conversion circuit 68 includes a first flip-flop 90(1) and a second flip-flop 90(2). The first flip-flop 90(1) is configured to receive the SDR low output stream 64(1) and provide a DDR low output stream 92(1) in response to the feedback clock signal 62. Further, the second flip-flop 90(2) is configured to receive the SDR high output stream 64(2) and provide a DDR high output stream 92(2) in response to the feedback clock signal 62. Notably, in this aspect, the SDR low and high output streams 64(1)-64(2) represent SDR versions of the low and high output enable signals generated by the digital logic circuit 54. The SDR low and high output streams 64(1)-64(2) are asserted in response to the corresponding output enable signals generated by the digital logic circuit 54 equaling logic '1' when the time slot is owned by the device 50. Further, in this aspect, the DDR low and high output streams 92(1)-92(2) represent DDR versions of the low and high output enable signals required to drive the data signal 74 (not shown) to the communications bus 76. A multiplexer 94 employed by the DDR conversion circuit 68 is configured to receive the DDR low and high output streams 92(1)-92(2) and provide the DDR output stream 70 to the output enable circuit 72, wherein the feedback clock signal 62 is used to select which signal is provided by the multiplexer 94.

With continuing reference to FIG. 4, the output enable circuit 72 in the control circuit 52 employs a delay circuit 96 that is configured to receive the feedback clock signal 62 and generate a delayed feedback clock signal 98. The output enable circuit 72 also employs an XOR-based gate 100 configured to receive the delayed feedback clock signal 98 and the standard clock signal 60, and provide a short valid signal 102 to an AND-based gate 104 in the output enable circuit 72. In this aspect, the XOR-based gate 100 is an XNOR gate, while the AND-based gate 104 is an AND gate. The DDR output stream 70 is also provided to the AND-based gate 104, wherein the AND-based gate 104 uses the short valid signal 102 and the DDR output stream 70 to provide the output enable signal 58. In this aspect, the output enable signal 58 is generated with timing according to the timing constraints of the SoundWire™ protocol by using the delay circuit 96. Thus, the timing provided by the delay circuit 96 causes the output enable circuit 72 to assert the output enable signal 58 no earlier than the tZD time following the most recent transition of the standard clock signal 60, and de-assert the output enable signal 58 no later than a tDZ time following the most recent transition of the standard clock signal 60. Further, the feedback generation circuit 66 includes first and second buffers 106(1)-106(2), wherein the first buffer 106(1) is configured to receive the standard clock signal 60 and provide a delayed standard clock signal 108(1) to the communications bus 76 via the bus interface 56. The second buffer 106(2) is configured to receive a delayed standard clock signal 108(2) from the communications bus 76 via the bus interface 56 and provide the feedback clock signal 62. In this manner, the feedback generation circuit 66 is configured to assist in meeting the above timing constraints by compensating for any input/output delays of signals within the control circuit 52. Thus, the control circuit 52 is configured to generate an accurately timed output enable signal 58 without a fast clock signal, thereby avoiding power-consuming fast clock circuitry. Therefore, the control circuit 52 may reduce power consumption as compared to circuits employing both a standard clock signal 60 and a fast clock signal.

Figure 5:
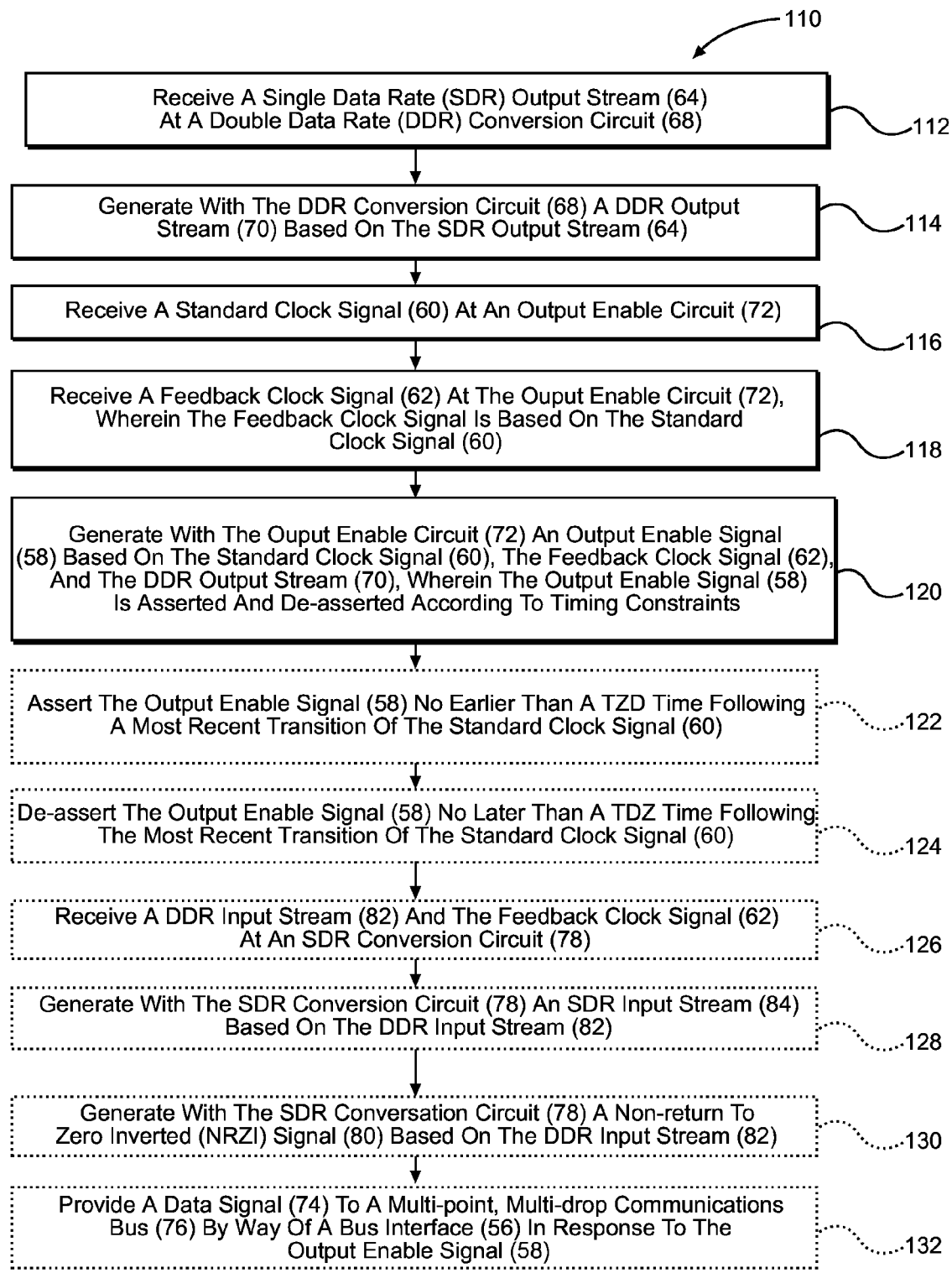
FIG. 5 is a flowchart illustrating an exemplary process for generating an output enable signal according to the timing constraints of the SoundWire™ protocol.

In this regard, FIG. 5 illustrates an exemplary process 110 that may be used by the control circuit 52 in FIG. 3 for generating the output enable signal 58 according to the timing constraints of the SoundWire™ protocol. The process 110 includes receiving the SDR output stream 64 at the DDR conversion circuit 68 (block 112) and generating with the DDR conversion circuit 68 the DDR output stream 70 based on the SDR output stream 64 (block 114). The process 110 also includes receiving the standard clock signal 60 at the output enable circuit 72 (block 116) and receiving the feedback clock signal 62 at the output enable circuit 72, wherein the feedback clock signal 62 is based on the standard clock signal 60 (block 118). Further, the process 110 includes generating with the output enable circuit 72 the output enable signal 58 based on the standard clock signal 60, the feedback clock signal 62, and the DDR output stream 70, wherein the output enable signal 58 is asserted and de-asserted according to timing constraints (block 120). In this aspect, because the process 110 generates the output enable signal 58 according to the SoundWire™ protocol, the process 110 includes asserting the output enable signal 58 no earlier than a tZD time following a most recent transition of the standard clock signal 60 (block 122). Further, the process 110 also includes de-asserting the output enable signal 58 no later than a tDZ time following the most recent transition of the standard clock signal 60 (block 124). In aspects where data may be received from the multi-point, multi-drop communications bus 76, the process 110 includes receiving the DDR input stream 82 and the feedback clock signal 62 at the SDR conversion circuit 78 (block 126) and generating with the SDR conversion circuit 78 the SDR input stream 84 based on the DDR input stream 82 (block 128). Further, the process 110 includes generating with the SDR conversion circuit 78 the NRZI data signal 80 based on the DDR input stream 82 (block 130). Additionally, the process 110 includes providing the data signal 74 to the multi-point, multi-drop communications bus 76 by way of the bus interface 56 in response to the output enable signal 58 (block 132). Notably, in this aspect, the communications bus 76 is a multi-point, multi-drop communications bus 76. By employing the process 110, the control circuit 52 is configured to generate an accurately timed output enable signal 58 without a fast clock signal, thus avoiding power-consuming fast clock circuitry.

Figure 6:
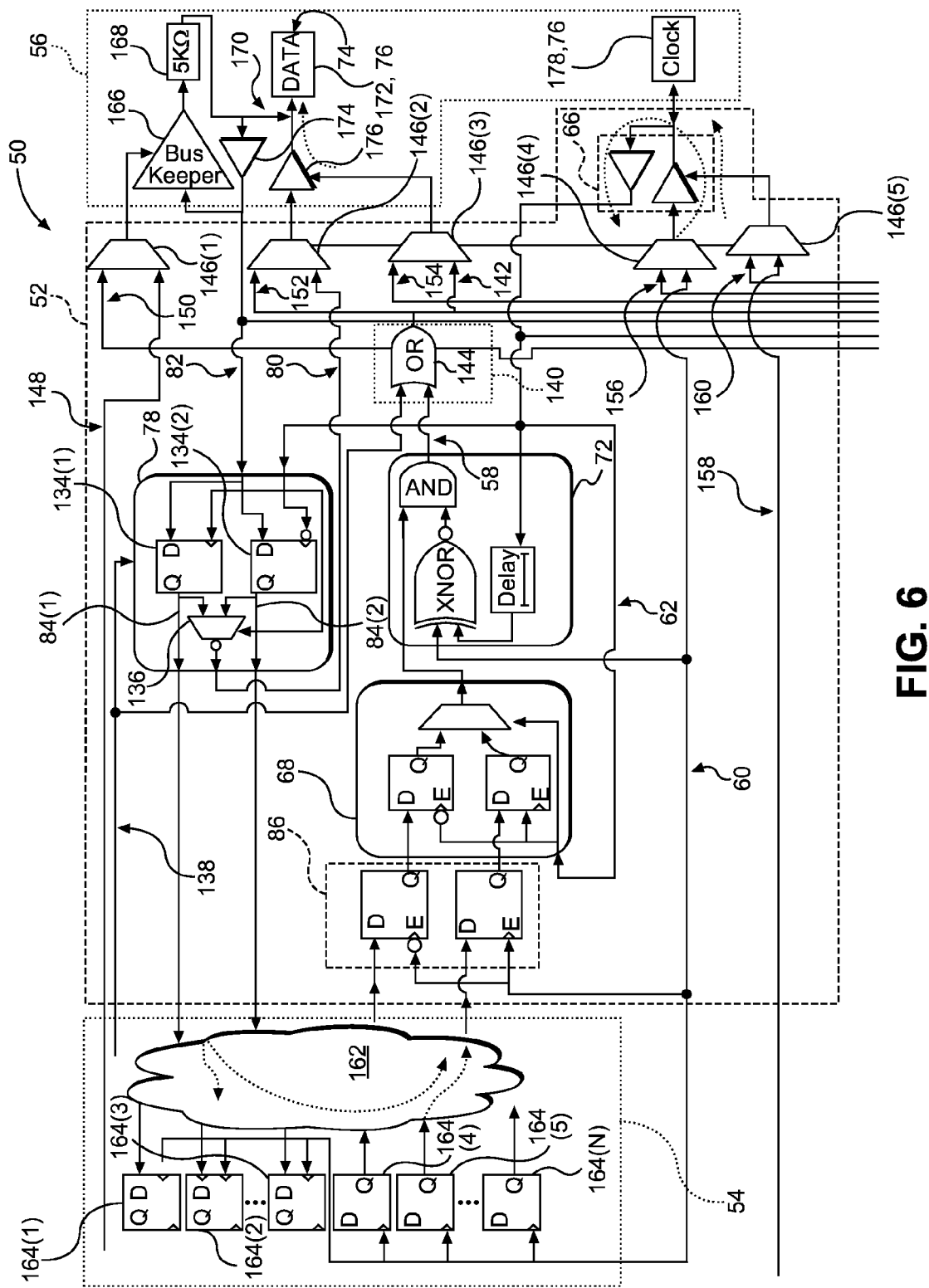
FIG. 6 is a circuit diagram of an exemplary control circuit coupling a digital logic circuit of a device to a bus interface of the device, wherein the control circuit is configured to generate an output enable signal according to the timing constraints of the SoundWire™ protocol.

In this regard, FIG. 6 illustrates a more detailed version of the control circuit 52 in FIG. 4, wherein the control circuit 52 is configured to generate the output enable signal 58 according to the timing constraints of the SoundWire™ protocol. The control circuit 52 includes the synchronizing circuit 86, the DDR conversion circuit 68, and the output enable circuit 72 as previously described in relation to FIG. 4. Further, the control circuit 52 also includes the SDR conversion circuit 78 previously described in FIG. 3. To convert the DDR input stream 82 into the SDR input stream 84, the SDR conversion circuit 78 includes a first flip-flop 134(1) that is configured to receive the DDR input stream 82 and provide the SDR low input stream 84(1) in response to the feedback clock signal 62. Further, the SDR conversion circuit 78 also includes a second flip-flop 134(2) that is configured to receive the DDR input stream 82 and provide the SDR high input stream 84(2) in response to the feedback clock signal 62. The SDR low and high input streams 84(1)-84(2) are provided to a multiplexer 136 that is configured to invert the SDR input stream 84 so as to provide the NRZI data signal 80 to the bus interface 56. In this aspect, the multiplexer 136 is also configured to provide the SDR low and high input streams 84(1)-84(2) to the digital logic circuit 54 as input data, wherein the digital logic circuit 54 is configured to process SDR data rather than DDR data. Notably, the SDR conversion circuit 78 is configured to receive a wakeup clock signal 138 from the digital logic circuit 54. The wakeup clock signal 138 is used to force activation of the control circuit 52 in particular circumstances, such as, but not limited to, activation of the digital logic circuit 54 following a low power or sleep mode. In this embodiment, the wakeup clock signal 138 is used to set the NRZI data signal 80 to a pre-defined state corresponding to the wakeup function prior to a transmission caused by the feedback clock signal 62.

With continuing reference to FIG. 6, the control circuit 52 also includes an output enable selection circuit 140 that is configured to provide a final output enable signal 142 to the bus interface 56. The output enable selection circuit 140 is configured to receive the output enable signal 58 and the wakeup clock signal 138. In this aspect, the output enable selection circuit 140 includes an OR-based gate 144 (i.e., an OR gate in this aspect). The OR-based gate 144 is configured to provide the final output enable signal 142, wherein the final output enable signal 142 is asserted either in response to the output enable signal 58 or the wakeup clock signal 138. Thus, the output enable selection circuit 140 allows the control circuit 52 to enable the bus interface 56 to drive the data signal 74 according to the Soundwire™ protocol timing constraints or upon activation of the digital logic circuit 54. Further, the control circuit 52 includes multiplexers 146(1)-146(5) that allow the bus interface 56 to exchange the data signal 74 with the communications bus 76 using a protocol other than that employed by the control circuit 52. In this manner, the multiplexer 146(1) is configured to select between a first keeper signal 148 and a second keeper signal 150 and the multiplexer 146(2) is configured to select between the NRZI data signal 80 and a second data output signal 152. Further, the multiplexer 146(3) is configured to select between the final output enable signal 142 and a second output enable signal 154, the multiplexer 146(4) is configured to select between the standard clock signal 60 and a second clock signal 156, and the multiplexer 146(5) is configured to select between a first clock output enable signal 158 and a second clock output enable signal 160.

With continuing reference to FIG. 6, in this aspect, the digital logic circuit 54 includes a logic block 162 configured to perform functions corresponding to the operation of the digital logic circuit 54. The digital logic circuit 54 also includes multiple flip-flops 164(1)-164(N) that are configured to exchange data with the logic block 162. Additionally, the bus interface 56 includes a keeper circuit 166 coupled to a resistor 168, wherein a keeper signal 170 from the resistor 168 serves to hold a value on a data wire 172 of the communications bus 76. The bus interface 56 also includes a data input buffer 174 and a data output buffer 176 configured to buffer input and output data, respectively. Further, the bus interface 56 is communicatively coupled to a clock wire 178 of the communications bus 76.

Figure 7:
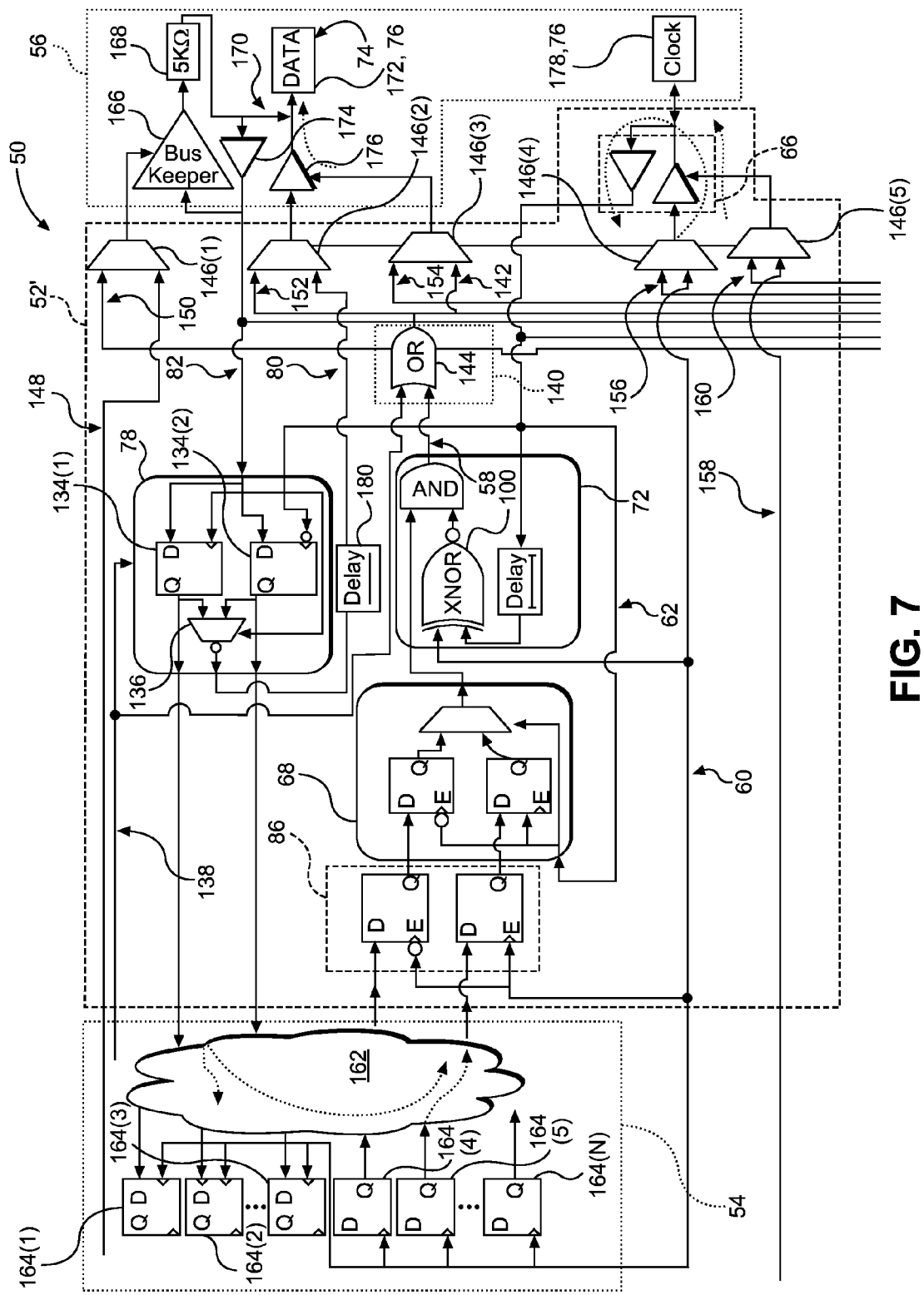
FIG. 7 is a circuit diagram of another exemplary control circuit coupling a digital logic circuit of a device to a bus interface of the device, wherein the control circuit is configured to generate an output enable signal according to the timing constraints of the SoundWire™ protocol.

In addition to the aspect described in relation to FIG. 6, other aspects may include alternative circuit elements to achieve similar functionality. In this regard, FIG. 7 illustrates a control circuit 52' which is similar to the control circuit 52 in FIG. 6. The control circuit 52' is configured to generate the output enable signal 58 according to the timing constraints of the SoundWire™ protocol. However, the control circuit 52' in FIG. 7 includes a data delay circuit 180 coupled to the NRZI data signal 80. The data delay circuit 180 may be employed to help stabilize the NRZI data signal 80 provided to the bus interface 56 to assist meeting the timing constraints.

Figure 8:
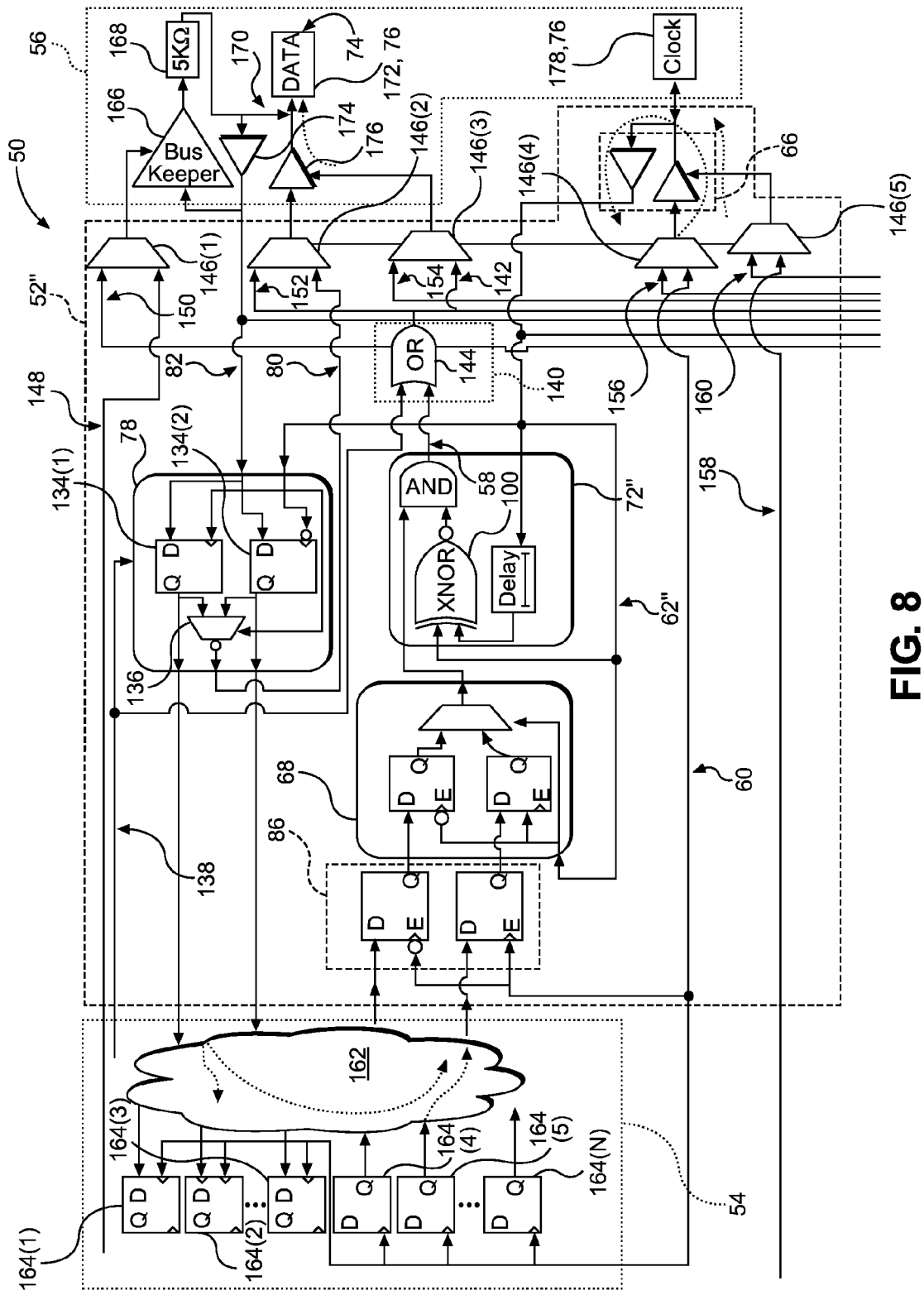
FIG. 8 is a circuit diagram of another exemplary control circuit coupling a digital logic circuit of a device to a bus interface of the device, wherein the control circuit is configured to generate an output enable signal according to the timing constraints of the SoundWire™ protocol.

Additionally, FIG. 8 illustrates a control circuit 52" which is similar to the control circuit 52 in FIG. 6, wherein the control circuit 52" is configured to generate the output enable signal 58 according to the timing constraints of the SoundWire™ protocol. However, the control circuit 52" in FIG. 8 includes an output enable circuit 72" that is configured to provide a feedback clock signal 62" to the XOR-based gate 100 instead of the standard clock signal 60. Providing the feedback clock signal 62" in this manner may reduce timing uncertainties when the duty cycle of the standard clock signal 60 is relatively very low by excluding delay attributable to a clock pad (not shown) associated with the clock wire 178 from critical timing paths. As non-limiting examples, the timing uncertainties that may be reduced include jitter and input/output delay. Without providing the feedback clock signal 62" to the XOR-based gate 100 in instances of the standard clock signal 60 having a relatively very low duty cycle, additional circuitry may be needed to reduce the described timing uncertainties. Thus, employing the aspect illustrated in FIG. 8 may help meet the timing constraints while mitigating the need for additional circuitry and a corresponding increase in cost and area.

The control circuits for generating output enable signals according to aspects disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 9:
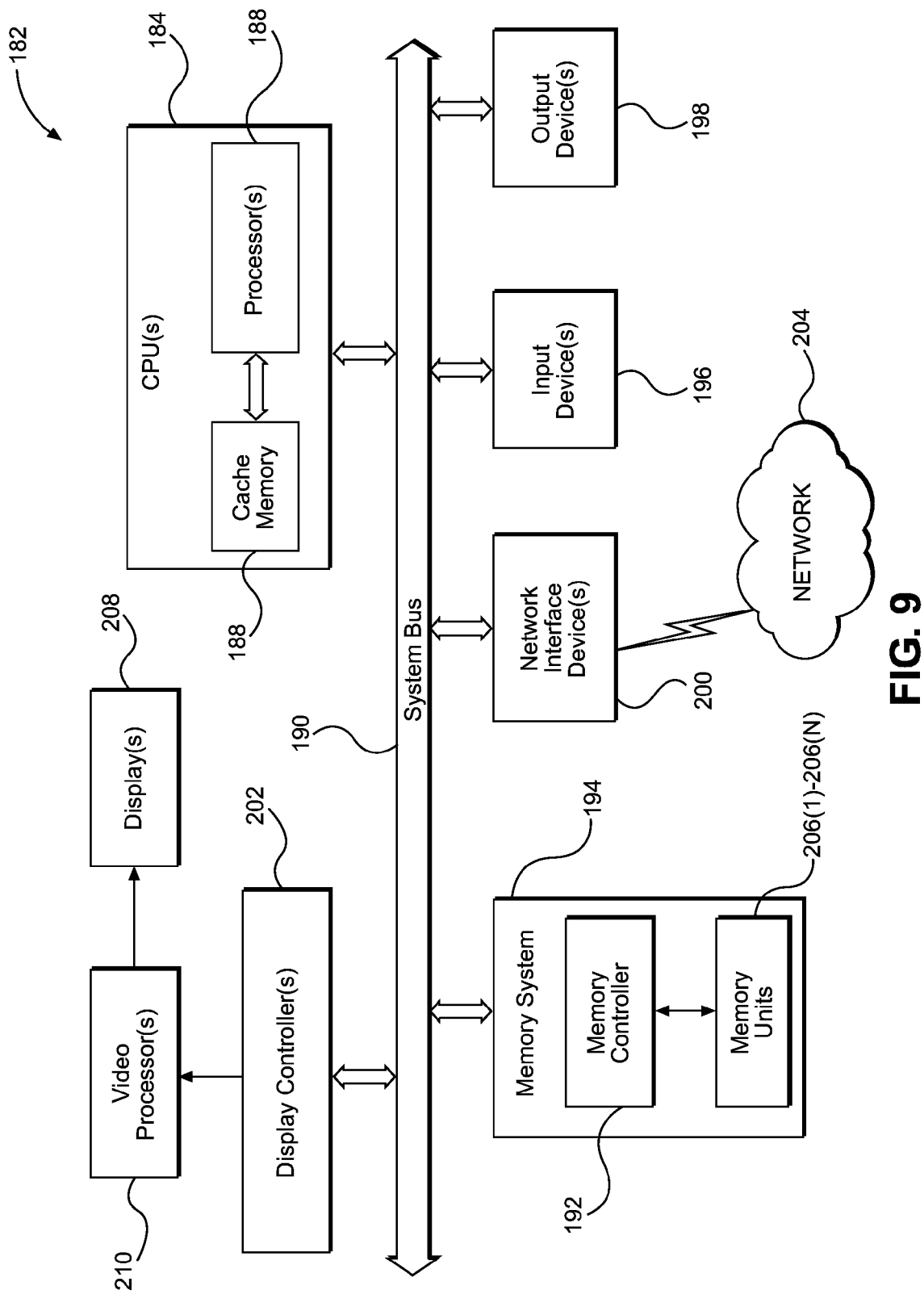
FIG. 9 is a block diagram of an exemplary processor-based system that can include the control circuit in FIG. 3 that is configured to generate an output enable signal according to the timing constraints of the SoundWire™ protocol.

In this regard, FIG. 9 illustrates an example of a processor-based system 182 that can employ the control circuit 52 illustrated in FIG. 3. In this example, the processor-based system 182 includes one or more central processing units (CPUs) 184, each including one or more processors 186. The CPU(s) 184 may be a master device. The CPU(s) 184 may have cache memory 188 coupled to the processor(s) 186 for rapid access to temporarily stored data. The CPU(s) 184 is coupled to a system bus 190 and can intercouple master and slave devices included in the processor-based system 182, wherein each master and slave device may include the control circuit 52. As is well known, the CPU(s) 184 communicates with these other devices by exchanging address, control, and data information over the system bus 190. The system bus 190 may be a multi-point, multi-drop communications bus, such as, but not limited to, a Soundwire™ communications bus that includes a data wire and a clock wire (not shown). For example, the CPU(s) 184 can communicate bus transaction requests to a memory controller 192 as an example of a slave device. Although not illustrated in FIG. 9, multiple system buses 190 could be provided, wherein each system bus 190 constitutes a different fabric.

Other master and slave devices can be connected to the system bus 190. As illustrated in FIG. 9, these devices can include a memory system 194, one or more input devices 196, one or more output devices 198, one or more network interface devices 200, and one or more display controllers 202, as examples. The input device(s) 196 can include any type of input device, including but not limited to input keys, switches, voice processors, etc. The output device(s) 198 can include any type of output device, including but not limited to audio, video, other visual indicators, etc. The network interface device(s) 200 can be any device configured to allow exchange of data to and from a network 204. The network 204 can be any type of network, including but not limited to a wired or wireless network, a private or public network, a local area network (LAN), a wireless local area network (WLAN), a wide area network (WAN), a BLUETOOTH™ network, or the Internet. The network interface device(s) 200 can be configured to support any type of communications protocol desired. The memory system 194 can include one or more memory units 206(1)-206(N).

The CPU(s) 184 may also be configured to access the display controller(s) 202 over the system bus 190 to control information sent to one or more displays 208. The display controller(s) 202 sends information to the display(s) 208 to be displayed via one or more video processors 210, which process the information to be displayed into a format suitable for the display(s) 208. The display(s) 208 can include any type of display, including but not limited to a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The master and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A control circuit, comprising:
a double data rate (DDR) conversion circuit, configured to:
receive a single data rate (SDR) output stream; and
generate a DDR output stream based on the SDR output stream; and
an output enable circuit, configured to:
receive a standard clock signal;
receive a feedback clock signal, wherein the feedback clock signal is based on the standard clock signal;
generate a delayed feedback clock signal based on timing constraints associated with each transition of the standard clock signal;
receive the DDR output stream generated by the DDR conversion circuit; and
generate an output enable signal based on the standard clock signal, the delayed feedback clock signal, and the DDR output stream, wherein the output enable signal is asserted and de-asserted according to the timing constraints.

2. The control circuit of claim 1, further comprising an SDR conversion circuit, configured to:
receive a DDR input stream;
receive the feedback clock signal;
generate an SDR input stream based on the DDR input stream; and
generate a non-return to zero inverted (NRZI) data signal based on the DDR input stream.

3. The control circuit of claim 2, wherein the SDR conversion circuit comprises:
a first flip-flop configured to:
receive the DDR input stream; and
provide an SDR low input stream in response to the feedback clock signal;
a second flip-flop configured to:
receive the DDR input stream; and
provide an SDR high input stream in response to the feedback clock signal; and
a multiplexer configured to:
receive the SDR low input stream;
receive the SDR high input stream; and
provide the NRZI data signal.

4. The control circuit of claim 1, wherein the control circuit is configured to provide a data signal to a multi-point, multi-drop communications bus by way of a bus interface in response to the output enable signal generated by the output enable circuit.

5. The control circuit of claim 4, wherein the multi-point, multi-drop communications bus comprises a SoundWire™ communications bus.

6. The control circuit of claim 1, wherein the output enable circuit comprises a delay circuit configured to:
receive the feedback clock signal from outside the output enable circuit; and
generate the delayed feedback clock signal.

7. The control circuit of claim 6, wherein the output enable circuit further comprises:
an XNOR gate configured to:
receive the delayed feedback clock signal;
receive the standard clock signal; and
provide a short valid signal; and
an AND gate configured to:
receive the short valid signal;
receive the DDR output stream from the DDR conversion circuit; and
provide the output enable signal.

8. The control circuit of claim 1, wherein the DDR conversion circuit is further configured to receive the feedback clock signal.

9. The control circuit of claim 8, wherein the DDR conversion circuit comprises:
a first flip-flop configured to:
receive an SDR low output stream; and
provide a DDR low output stream in response to the feedback clock signal;
a second flip-flop configured to:
receive an SDR high output stream; and
provide a DDR high output stream in response to the feedback clock signal; and
a multiplexer configured to:
receive the DDR low output stream;
receive the DDR high output stream; and
provide the DDR output stream.

10. The control circuit of claim 1, further comprising a feedback generation circuit comprising:
a first buffer configured to:
receive the standard clock signal; and
provide a delayed standard clock signal; and
a second buffer configured to:
receive the delayed standard clock signal; and
provide the feedback clock signal.

11. The control circuit of claim 1 configured to interface with a digital logic circuit of a master device.

12. The control circuit of claim 1 configured to interface with a digital logic circuit of a slave device.

13. The control circuit of claim 1, wherein the output enable circuit is configured to generate the output enable signal by being configured to:
assert the output enable signal no earlier than a tZD time following a most recent transition of the standard clock signal; and
de-assert the output enable signal no later than a tDZ time following the most recent transition of the standard clock signal.

14. The control circuit of claim 1 integrated into an integrated circuit (IC).

15. The control circuit of claim 1 integrated into a device selected from the group consisting of: a set top box; an entertainment unit; a navigation device; a communications device; a fixed location data unit; a mobile location data unit; a mobile phone; a cellular phone; a computer; a portable computer; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; and a portable digital video player.

16. A control circuit, comprising:
a means for receiving a single data rate (SDR) output stream;
a means for generating a double data rate (DDR) output stream based on the SDR output stream;
a means for receiving a standard clock signal;
a means for receiving a feedback clock signal, configured to:

receive the feedback clock signal, wherein the feedback clock signal is based on the standard clock signal; and generate a delayed feedback clock signal based on timing constraints associated with each transition of the standard clock signal; and a means for generating an output enable signal based on the standard clock signal, the delayed feedback clock signal, and the DDR output stream, wherein the output enable signal is asserted and de-asserted according to the timing constraints.

17. A method for providing an output enable signal, comprising:
receiving a single data rate (SDR) output stream at a double data rate (DDR) conversion circuit;
generating with the DDR conversion circuit a DDR output stream based on the SDR output stream;
receiving a standard clock signal at an output enable circuit;
generating a delayed feedback clock signal at the output enable circuit based on timing constraints associated with each transition of the standard clock signal;
receiving a feedback clock signal at the output enable circuit, wherein the feedback clock signal is based on the standard clock signal; and
generating with the output enable circuit an output enable signal based on the standard clock signal, the delayed feedback clock signal, and the DDR output stream, wherein the output enable signal is asserted and de-asserted according to the timing constraints.

18. The method of claim 17, further comprising:
receiving a DDR input stream and the feedback clock signal at an SDR conversion circuit;
generating with the SDR conversion circuit an SDR input stream based on the DDR input stream; and
generating with the SDR conversion circuit a non-return to zero inverted (NRZI) data signal based on the DDR input stream.

19. The method of claim 18, further comprising providing a data signal to a multi-point, multi-drop communications bus by way of a bus interface in response to the output enable signal.

20. The method of claim 17, wherein generating with the output enable circuit the output enable signal based on the standard clock signal comprises:
asserting the output enable signal no earlier than a tZD time following a most recent transition of the standard clock signal; and
de-asserting the output enable signal no later than a tDZ time following the most recent transition of the standard clock signal.

21. A system, comprising:
a multi-point, multi-drop communications bus comprising:
a data wire; and
a clock wire; and a master device coupled to one or more slave devices via the multi-point, multi-drop communications bus, the master device comprising:
a digital logic circuit configured to complete operations associated with the master device;
a bus interface configured to interface with the multi-point, multi-drop communications bus; and
a control circuit, comprising:
a double data rate (DDR) conversion circuit, configured to:
receive a single data rate (SDR) output data stream; and
generate a DDR output stream based on the SDR output stream; and
an output enable circuit, configured to:
receive a standard clock signal;
receive a feedback clock signal, wherein the feedback clock signal is based on the standard clock signal;
generate a delayed feedback clock signal based on timing constraints associated with each transition of the standard clock signal;
receive the DDR output stream generated by the DDR conversion circuit; and
generate an output enable signal based on the standard clock signal, the delayed feedback clock signal, and the DDR output stream, wherein the output enable signal is asserted and de-asserted according to the timing constraints.

22. The system of claim 21, wherein the multi-point, multi-drop communications bus comprises a SoundWireT™ communications bus.

23. The system of claim 21, further comprising the one or more slave devices, wherein each of the one or more slave devices comprises:
a digital logic circuit configured to complete operations associated with the corresponding slave device;
a bus interface configured to interface with the multi-point, multi-drop communications bus; and
a control circuit, comprising:
a DDR conversion circuit, configured to:
receive an SDR output stream; and
generate a DDR output stream based on the SDR output stream; and
an output enable circuit, configured to:
receive a standard clock signal;
receive a feedback clock signal, wherein the feedback clock signal is based on the standard clock signal;
receive the DDR output stream generated by the DDR conversion circuit; and
generate an output enable signal, wherein the output enable signal is asserted and de-asserted according to timing constraints.

* * * * *